United States Patent
Cho

(10) Patent No.: US 6,667,780 B2
(45) Date of Patent: Dec. 23, 2003

(54) LIQUID CRYSTAL DISPLAY MODULE AND LIQUID CRYSTAL DISPLAY APPARATUS HAVING THE SAME

(75) Inventor: Chun-Hyun Cho, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 115 days.

(21) Appl. No.: 10/071,735

(22) Filed: Feb. 8, 2002

(65) Prior Publication Data

US 2003/0043310 A1 Mar. 6, 2003

(30) Foreign Application Priority Data

Sep. 3, 2001 (KR) .................................. 2001-53919

(51) Int. Cl.[7] ..................... G02F 1/1333; G02F 1/1335; F21V 7/04
(52) U.S. Cl. ........................ 349/58; 349/62; 349/63; 349/65; 362/31
(58) Field of Search ..................... 349/58, 61–65; 362/31, 27

(56) References Cited

U.S. PATENT DOCUMENTS

| 5,335,100 A | * | 8/1994 | Obata ........................... 349/65 |
|---|---|---|---|
| 5,504,605 A | * | 4/1996 | Sakuma et al. ................ 349/58 |
| 6,330,150 B1 | * | 12/2001 | Kim ............................. 361/683 |
| 6,593,979 B1 | * | 7/2003 | Ha et al. ....................... 349/58 |
| 6,595,651 B2 | * | 7/2003 | Jeong et al. ................... 362/31 |
| 2001/0003471 A1 | * | 6/2001 | Lee et al. ...................... 349/58 |
| 2001/0035923 A1 | * | 11/2001 | Cha et al. ...................... 349/65 |
| 2002/0093603 A1 | * | 7/2002 | Chen ............................. 349/65 |

* cited by examiner

Primary Examiner—Tarifur R. Chowdhury
(74) Attorney, Agent, or Firm—Cantor Colburn LLP

(57) ABSTRACT

Disclosed is a liquid crystal display apparatus which is reduced in an overall size and a weight of thereof. A lamp cover for protecting a lamp is disposed directly contacting a first sidewall of a bottom chassis. A light guiding plate for guiding the light from the lamp to a display unit and optical sheets for controlling a visual angle of the light are fixed in a receiving space of the bottom chassis by a guide frame which is installed at a second sidewall of the bottom chassis perpendicular to the lamp. Therefore, the size of the liquid crystal display device can be reduced by a thickness of the sidewall of a conventional mold frame. A mold frame having a low thermal conductivity does not exist between the lamp cover and the sidewall of the bottom chassis, so the heat generated from the lamp can be easily discharged.

25 Claims, 16 Drawing Sheets

LIQUID CRYSTAL DISPLAY MODULE AND LIQUID CRYSTAL DISPLAY APPARATUS HAVING THE SAME

BACKGROUND OF THE INVENTION

1. Field of the Invention

The present invention relates to a liquid crystal display apparatus, and more particularly to a liquid crystal display apparatus which is reduced in an overall size and a weight thereof.

2. Description of the Related Art

Recently, information processing devices have rapidly developed to have various shapes and functions with an enhanced data processing speed. In such information processing devices, information processed in the form of an electric signal requires a display device as an interface.

A liquid crystal display apparatus having a light weight and a compact size as compared with a CRT type display device has been developed to achieve full-color and high-resolution performance capabilities. Generally, the liquid crystal display apparatus displays an image according to changes in an arrangement of liquid crystal molecules when a voltage is applied to a liquid crystal cell. Visual properties of the liquid crystal display apparatus mainly depend on optical properties, such as birefringence, optical linearity, dichroism and light scattering features, of liquid crystal cells.

FIG. 1 is an exploded perspective view schematically showing a conventional liquid crystal display apparatus, and FIG. 2 is a sectional view showing an assembled structure of the liquid crystal display apparatus shown in FIG. 1.

Referring to FIG. 1, the liquid crystal display apparatus 100 includes a liquid crystal display module 130 for displaying an image upon receiving an image signal, and front and rear cases 110 and 120 for receiving the liquid crystal display module 130 therein. The liquid crystal display module 130 includes a display unit 170 having a liquid crystal display panel for displaying the image and a backlight assembly 150 for providing light to the display unit 170.

The display unit 170 has a liquid crystal display panel 171, data and gate printed circuit boards 176 and 175, and data and gate tape carrier packages 178 and 174.

The liquid crystal display panel 171 includes a thin film transistor substrate 172, a color filter substrate 173 and a liquid crystal (not shown).

The thin film transistor substrate 172 includes a transparent glass substrate on which thin film transistors are formed in a matrix form. Source terminals of the thin film transistors are connected with data lines, and gate terminals are connected with gate lines thereof. Drain terminals are formed with a pixel electrode formed of a transparent conductive material such as Indium-Tin-Oxide (ITO).

The color filter substrate 173 is disposed facing the thin film transistor substrate 172. RGB pixels, which are color pixels for emitting predetermined colors when the light passes therethrough, are formed on the color filter substrate 173. A common electrode formed of ITO is coated on an entire surface of the color filter substrate 173.

When a power is applied to the gate terminal and the source terminal of the thin film transistor formed on the thin film transistor substrate 172, and the thin film transistor is turned on, an electric field is generated between the pixel electrode and the common electrode of the color filter substrate 173. The electric field varies an aligning angle of the liquid crystal injected between the thin film transistor substrate 172 and the color filter substrate 173. Accordingly, the light transmission is varied according to the variation of the aligning angle of the liquid crystal, so a desired image can be displayed. In addition, in order to control the aligning angle and the aligning timing of the liquid crystal in the liquid crystal display panel 171, a driving signal and a timing signal are applied to the gate and data lines of the thin film transistor.

The backlight assembly 150 is provided below the display unit 170 and uniformly supplies the light into the display unit 170. The backlight assembly 150 includes lamp units 161 and 162 at opposite ends of the liquid crystal display module 130 and generates the light. The backlight assembly 150 further includes a light guiding plate 152 for changing a path of the light while guiding the light to the display unit 170, a plurality of optical sheets 153 for enhancing uniformity of a brightness of the light emitted from the light guiding plate 152, and a reflecting plate 154 which is disposed below the light guiding plate 152 to reflect the light leaked from the light guiding plate 152 to the light guiding plate 152, thereby improving the optical efficiency.

The display unit 170 and the backlight assembly 150 are sequentially received in a mold frame 132, which is received in a bottom chassis 134. In order to prevent the display unit 170 from being separated from the mold frame 132, a top chassis 140 is coupled to the bottom chassis 134.

Then, a shield case (not shown) may be installed at a rear portion of the bottom chassis 134 for shielding electromagnetic waves from an inverter circuit (not shown), which supplies a power to the liquid crystal display module 130. The front case 110 is coupled to the rear case 120 to complete an assembly of the liquid crystal display apparatus.

As shown in FIG. 2, the lamp units 161 and 162 and the light guiding plate 152 are completely received in a receiving space of the mold frame 132. A sidewall of the mold frame 132 is outwardly positioned with respect to the lamp units 161 and 162, so that the lamp units 161 and 162 and the light guiding plate 152 are prevented from moving in the receiving space.

However, the above-mentioned conventional liquid crystal display apparatus has following disadvantages.

Firstly, a width of the liquid crystal display apparatus, that is, a width of opposite ends of the liquid crystal display apparatus for receiving the lamp units 161 and 162 is increased by the sum of thickness t1 and t2 of the sidewalls of the mold frame 132. Therefore, an overall width of the liquid crystal display apparatus is remarkably enlarged.

In addition, since the outer portion of the lamp units 161 and 162 is covered with the mold frame 132 having a low thermal conductivity, the heat generated from the lamp units 161 and 162 is not easily discharged.

SUMMARY OF THE INVENTION

The present invention remedies the above problems of the prior art in that the invention provides a liquid crystal display module which is reduced in an overall size and a weight thereof.

The invention further provides a liquid crystal display apparatus which is reduced in an overall size and a weight thereof.

Firstly, there is provided a liquid crystal display module having a light generating section for generating a light. A light guiding plate guides the light to a displaying section for displaying an image. A container receives the light generating section and the light guiding plate. A guide member is coupled to first opposite ends of the container for guiding the light generating section and the light guiding plate to receiving positions in the container. The light generating section is placed on at least one end of second opposite ends of the container, the second opposite ends being perpendicular to the first opposite ends of the container. The light generation section directly contacts sidewalls of the second opposite ends of the container.

Secondly, there is provided a liquid crystal display apparatus having a light generating section for generating a light. A light guiding plate guides the light and a brightness improving section improves a brightness of the light emitted from the light guiding plate. A container receives the light generating section, the light guiding plate and the brightness improving section. A guide member is coupled to first opposite ends of the container for guiding the light generating section, light guiding plate and brightness improving section to receiving positions in the container. A fixing section is disposed above the brightness improving section and coupled with the container and the guide member to fix the light guiding plate and the brightness improving section to the container. A displaying section is disposed above the fixing section for displaying an image in response to the light supplied through the brightness improving section. A front case is coupled to a rear case to receive the displaying section therebetween.

The light generating section is placed on at least one end of the second opposite ends of the container, the second opposite ends being perpendicular to the first opposite ends of the container. The light generating section directly contacts sidewalls of the second opposite ends of the container.

The container includes a bottom surface section and a sidewall section, and sidewalls of the first opposite ends of the container coupled with the guide member are partially opened. The sidewalls of the first opposite ends are formed with a perforation hole extending to a portion of the bottom surface section of the container.

The guide member includes a first mold frame coupled to a first end of the first opposite ends of the container and a second mold frame coupled to a second end of the first opposite ends which is opposite the first end. The first mold frame includes a first fixing protrusion which is coupled to the perforation hole formed at a sidewall of the first end, and the second mold frame includes a second fixing protrusion which is coupled to the perforation hole formed at a sidewall of the second end.

Each of upper surfaces of the first and second mold frames are partially depressed to form a recess. The fixing section includes a bottom surface having a fixing projection. The fixing projection is inserted into each of the recesses formed in the first and second mold frames and prevents the guide member from separating from the container.

According to the liquid crystal display module and liquid crystal display apparatus, a lamp cover for protecting a lamp is disposed directly contacting a first sidewall of a bottom chassis. The light guiding plate and optical sheets are prevented from moving by a guide frame, which is disposed at a second sidewall of the bottom chassis perpendicular to the lamp.

Therefore, the size of the liquid crystal display apparatus can be reduced by a thickness of the sidewall of a mold frame compared with conventional liquid crystal display apparatus employing the conventional mold frame. In addition, since a mold frame having a low thermal conductivity does not exist between the lamp cover and the sidewall of the bottom chassis, the heat generated from the lamp can be easily discharged.

BRIEF DESCRIPTION OF THE DRAWINGS

The above objects and other advantages of the present invention will become more apparent by describing in detail exemplary embodiments thereof with reference to the accompanying drawings in which.

DETAILED DESCRIPTION OF THE INVENTION

Hereinafter, exemplary embodiments of the present invention will be described in detail with reference to the accompanying drawings.

Figure 1:
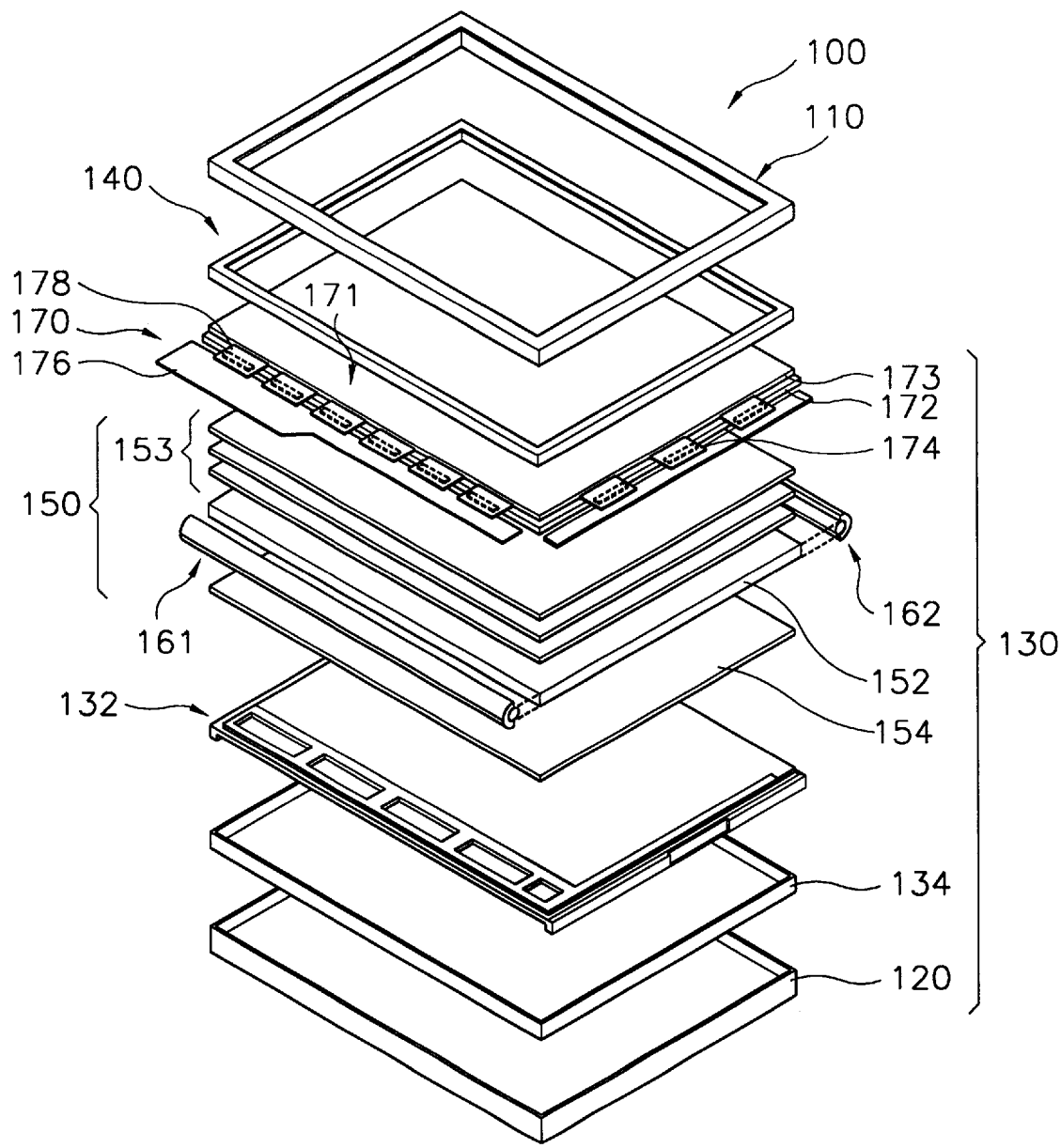
FIG. 1 is an exploded perspective view schematically showing a conventional liquid crystal display apparatus.
Figure 2:
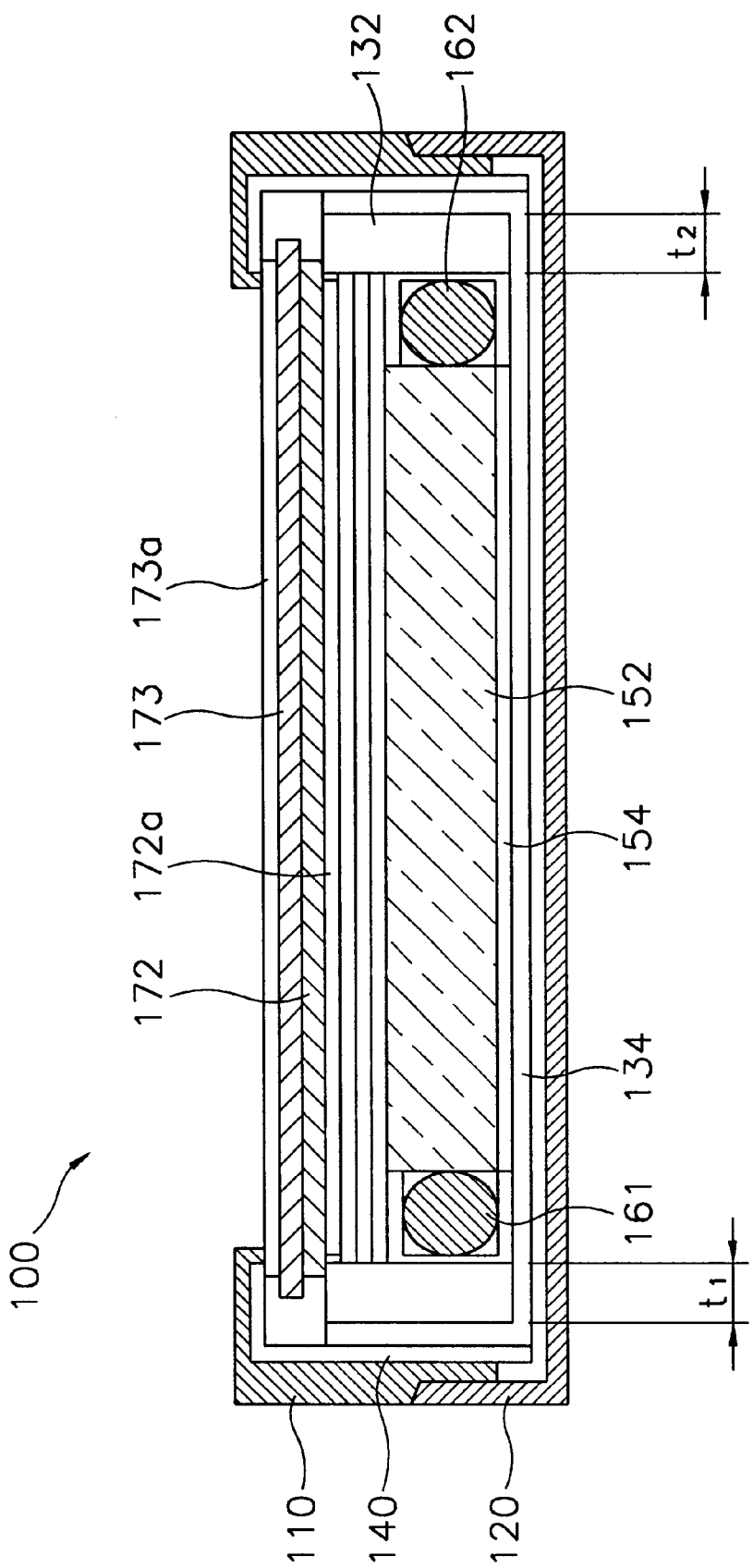
FIG. 2 is a sectional view showing an assembled structure of the liquid crystal display apparatus shown in FIG. 1.
Figure 3:
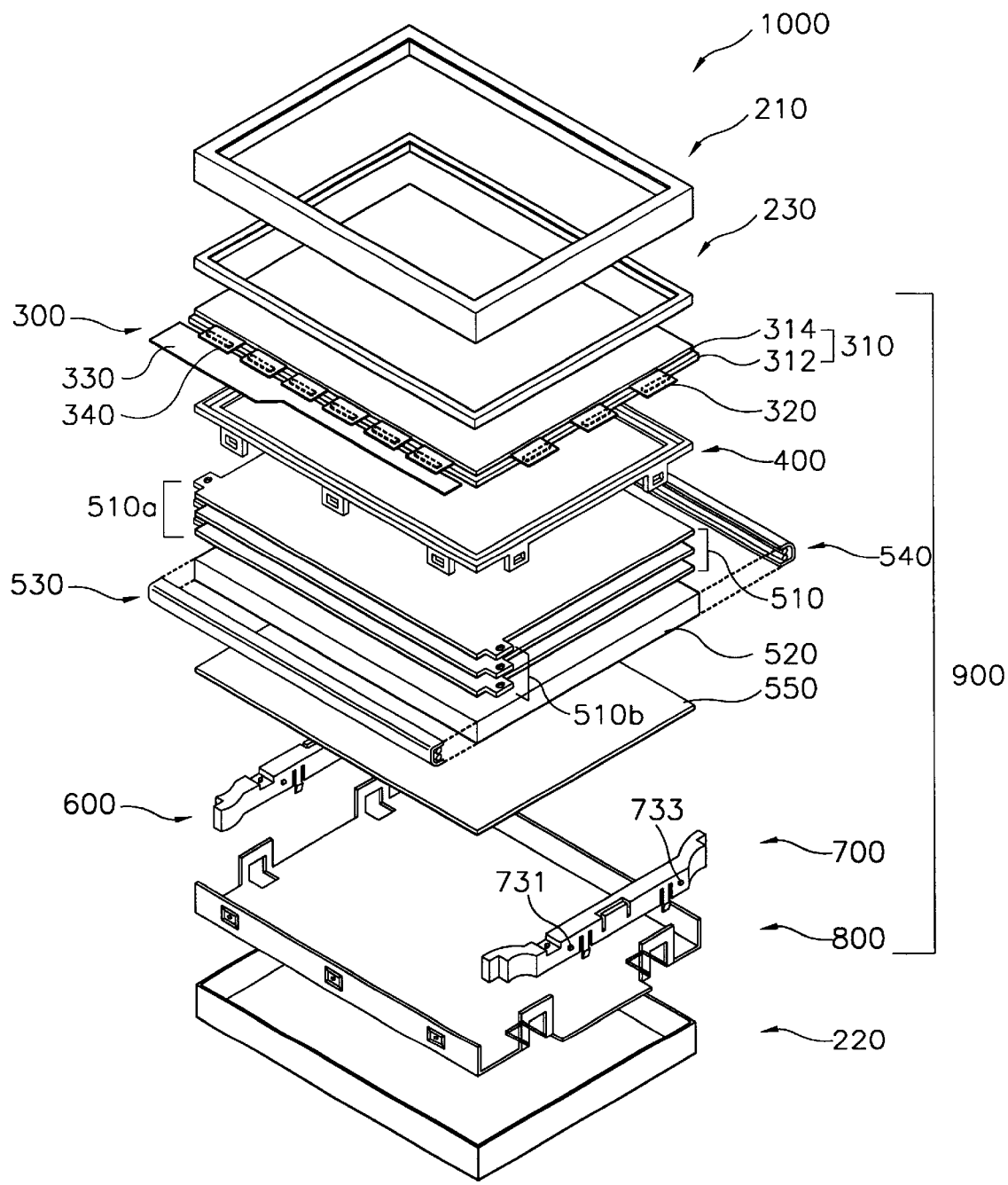
FIG. 3 is an exploded perspective view showing a liquid crystal display apparatus according to an exemplary embodiment of the present invention.

FIG. 3 is an exploded perspective view of a liquid crystal display apparatus according to an exemplary embodiment of the present invention.

Referring to FIG. 3, the liquid crystal display apparatus 1000 includes a liquid crystal display module 900 for displaying an image in response to an image signal, and a case having front and rear cases 210 and 220 for receiving the liquid crystal display module 900.

The liquid crystal display module 900 is divided into a display unit 300 having a liquid crystal display panel for displaying the image, and a backlight assembly for transmitting the light to the display unit 300.

Hereinafter, the structure of the liquid crystal display apparatus will be described in detail.

The display unit 300 includes a liquid crystal display panel 310, a panel driving printed circuit board 330 (hereinafter, referred to as an integrated printed circuit board), a data tape carrier package (TCP) 340, and a gate tape carrier package 320.

A first driving circuit connected to the gate tape carrier package 320 so as to drive a gate line of the liquid crystal display panel 310 and a second driving circuit connected to the data tape carrier package 340 so as to drive a data line of the liquid crystal display panel 310 are mounted on the integrated printed circuit board 330.

That is, wiring patterns for transmitting gate line driving signals to the liquid crystal display panel 310 are formed on the gate tape carrier package 320. The integrated printed circuit board 330 is connected to only one side of the liquid crystal display panel 310 through the data tape carrier package 340.

Since the integrated printed circuit board 330 is formed by integrating driving circuits of a gate printed circuit board and a data printed circuit board on one printed circuit board, a high density mounting technique is required to mount the driving circuits on the printed circuit board. For example, by using a chip on glass (COG) technique, parts of the gate and data driving circuits are directly wire-bonded or bumped on the printed circuit board in a chip state or a part state, instead of a package state.

The liquid crystal display panel 310 includes a thin film transistor substrate 312, a color filter substrate 314, and a liquid crystal (not shown).

The thin film transistor substrate 312 includes a transparent glass substrate on which thin film transistors are formed in a matrix form. A data line is connected to a source terminal of the thin film transistor and a gate line is connected to a gate terminal of the thin film transistor. A pixel electrode, which is generally formed of a transparent conductive material such as Indium Tin Oxide (ITO), is connected to a drain terminal of the thin film transistor.

When an electric signal is applied to the data line and the gate line, electrical signals are inputted into the source and drain terminals of each thin film transistor, so the thin film transistor is turned on or turned off according to the electric signals while outputting an electric signal required for forming a pixel through the drain terminal.

The color filter substrate 314 is disposed facing the thin film transistor substrate 312. RGB pixels, which are color pixels for emitting predetermined colors when the light passes therethrough, are formed on the color filter substrate 314 by, for example, a thin film manufacturing process. A common electrode which is generally made of ITO is coated on an entire surface of the color filter substrate 314.

When a power is applied to the gate terminal and the source terminal of the thin film transistor formed on the thin film transistor substrate 312, the thin film transistor is turned on, generating an electric field between the pixel electrode and the common electrode of the color filter substrate 314. The electric field varies an aligning angle of the liquid crystal injected between the thin film transistor substrate 312 and the color filter substrate 314. Accordingly, the light transmission is varied according to the variation of the aligning angle of the liquid crystal, so a desired pixel can be obtained.

In order to control the aligning angle and the aligning timing of the liquid crystal in the liquid crystal display panel 310, a driving signal and a timing signal are applied to the gate and data lines of the thin film transistor.

As shown in FIG. 3, the data tape carrier package 340, which is a kind of flexible circuit board, is attached to a source side of the liquid crystal display panel 310 to determine a timing for applying a data driving signal and the gate tape carrier package 320 is attached to a gate side of the liquid crystal panel 310 to determine a timing for applying a gate driving signal.

The integrated printed circuit board 330 is connected to the data tape carrier package 340 at a data line side of the liquid crystal display panel 310 and applies the driving signals to the gate line and the data line according to an image signal from an exterior of the liquid crystal display panel 310. The integrated printed circuit board 330 includes a source section for applying the data driving signal to the liquid crystal display panel 310 according to the image signals from an external information processing device (not shown), such as a computer, and a gate section for applying the gate driving signal to the gate line of the liquid crystal display panel 310.

That is, the integrated printed circuit board 330 generates signals for driving the liquid crystal display device, such as the gate driving signal, the data driving signal and a plurality of timing signals for timely applying the gate and data driving signals. The gate driving signal is applied to the gate line of the liquid crystal display panel 310 through the gate tape carrier package 320 and the data driving signal is applied to the data line of the liquid crystal display panel 310 through the data tape carrier package 340.

A backlight assembly is provided below the display unit 300 and uniformly supplies the light to the display unit 300. The backlight assembly includes first and second lamp units 530 and 540 for generating the light. Each of first and second lamp units 530 and 540 has two lamps. Though the liquid crystal display device including two lamp units are illustrated and explained, according to another embodiment of the present invention, it is also possible to adopt one lamp unit to the liquid crystal display device to achieve the objects and advantages of the present invention.

A light guiding plate 520 may have a size corresponding to the liquid crystal display panel 310 of the display unit 300 and is positioned below the liquid crystal display panel 310 to change an optical path while guiding the light emitted from the first and second lamps 530 and 540 toward the display unit 300.

A plurality of optical sheets 510 are provided above the light guiding plate 520, enhancing uniformity of the brightness of the light guided toward the liquid crystal display panel 310. First and second projections 510a and 510b extend from predetermined portions at opposite ends of the optical sheet 510. Coupling holes are formed on the first and second projections 510a and 510b. A reflecting plate 550 is disposed below the light guiding plate 520 to reflect the light leaked from the light guiding plate 520 toward the light guiding plate 520, thereby improving the optical efficiency.

The backlight assembly is received in a bottom chassis 800. First and second guide frames 600 and 700 are disposed at opposite ends of the bottom chassis 800 and guide the light guiding plate 520, first and second lamp units 530 and 540 and optical sheets 510 to their receiving positions in the bottom chassis 800, preventing them from moving from the receiving positions.

A middle mold frame 400 is provided below the display unit 300. The middle mold frame 400 is coupled with the bottom chassis 800 and first and second guide frames 600 and 700 and fix the light guiding plate 520, first and second lamp units 530 and 540 and the optical sheets 510 to the bottom chassis 800.

A top chassis 230 is provided above the display unit 300. The top chassis 230 is coupled with the bottom chassis 800 while allowing the integrated printed circuit board 330 to be outwardly bent from the bottom chassis 800 and the top chassis 230 and preventing the display unit 300 from separating from the bottom chassis 800.

Hereinafter, the assembled structure of the liquid crystal display apparatus will be described with reference to FIGS. 4 to 16.

Figure 4:
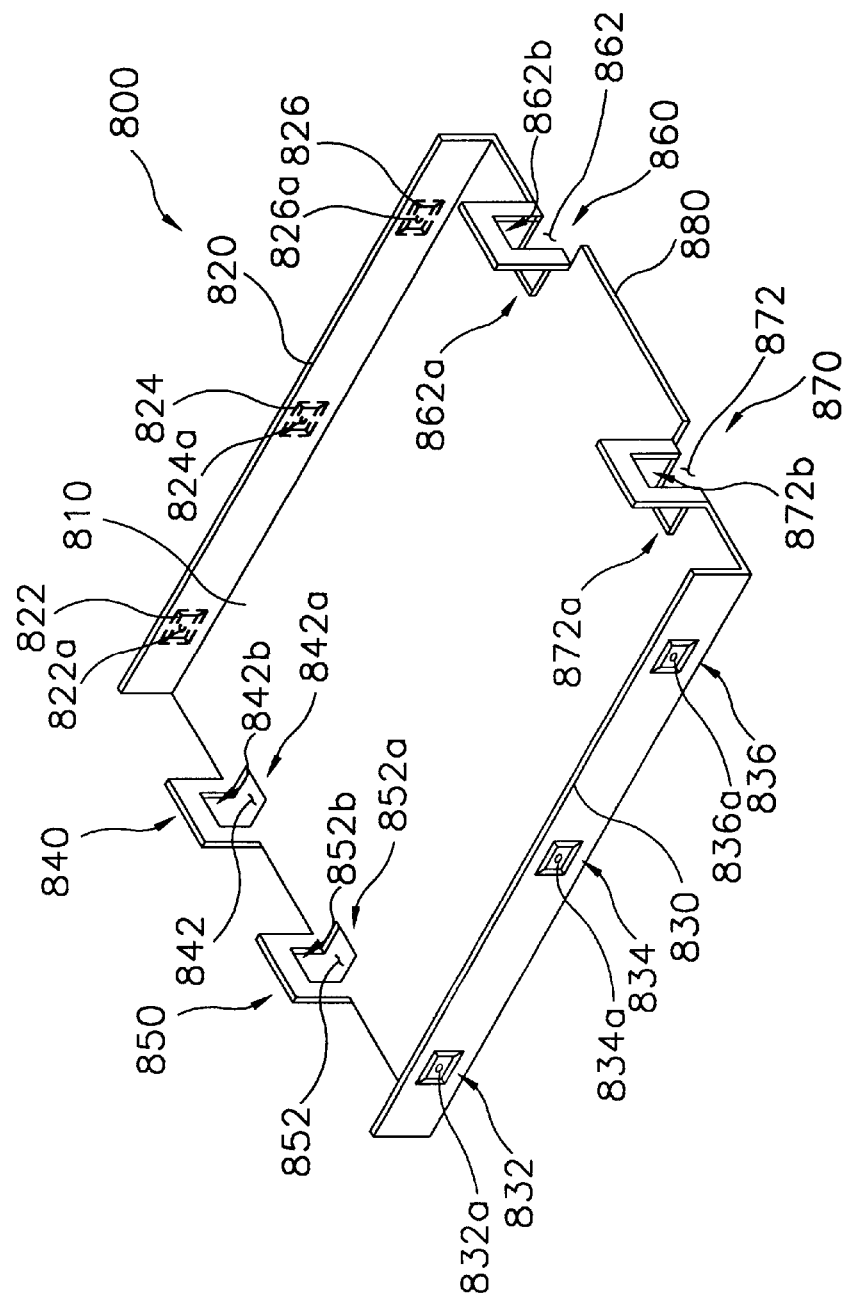
FIG. 4 is a perspective view showing the structure of a bottom chassis shown in FIG. 3.
Figure 5:
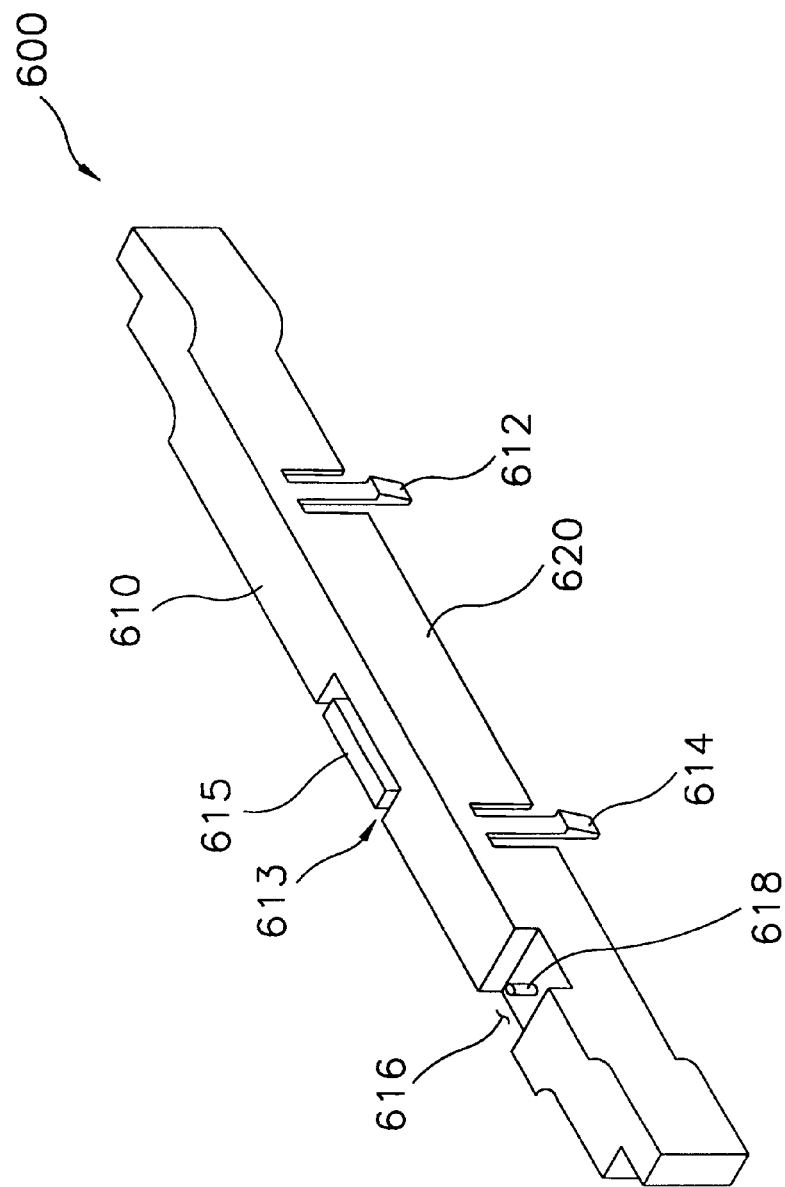
FIGS. 5 to 8 are detailed views of a guide frame shown in FIG. 3.

FIG. 4 is a perspective view showing the structure of the bottom chassis shown in FIG. 3, in detail.

Referring to FIG. 4, the bottom chassis 800 includes a bottom surface section 810 and a sidewall section extended perpendicularly from ends of the bottom surface section 810. The sidewall section includes a continuous sidewall section and a discontinuous sidewall section.

In an outer portion of a first sidewall 820 of the continuous sidewall section, first, second and third embossing parts 822, 824 and 826 are protruded a predetermined height and are spaced from each other by a predetermined distance.

When the bottom chassis 800 is combined with the middle mold frame 400, the first, second and third embossing parts 822, 824 and 826 are inserted into coupling holes formed in a sidewall of the middle mold frame 400 corresponding to the first sidewall 820 of the continuous sidewall section. In addition, first, second and third protrusions 822a, 824a, and 826a are formed at the first, second and third embossing parts 822, 824 and 826 with a predetermined height. The first, second and third protrusions 822a, 824a, and 826a are coupled with slots formed in a sidewall of the top chassis 230 corresponding to the first sidewall 820 of the continuous sidewall section.

In the same manner, fourth, fifth and sixth embossing parts 832, 834 and 836 are protruded at an outer portion of a second sidewall 830 opposite the first sidewall 820 with a predetermined height and are spaced from each other by a predetermined distance. The fourth, fifth and sixth embossing parts 832, 834 and 836 are inserted into coupling holes formed in a sidewall of the middle mold frame 400 corresponding to the second sidewall 830 of the continuous sidewall section. In addition, fourth, fifth and sixth protrusions 832a, 834a, and 836a are formed at the fourth, fifth and sixth embossing parts 832, 834 and 836 with a predetermined height. The fourth, fifth and sixth protrusions 832a, 834a, and 836a are coupled with slots formed in a sidewall of the top chassis 230 corresponding to the second sidewall 830 of the continuous sidewall section. The assembled structure of the bottom chassis 800, the middle mold frame 400 and the top chassis 230 will be described later in detail.

The discontinuous sidewall section includes partially opened portions. That is, the discontinuous sidewall section includes first and second fixing sidewalls 840, 850 spaced from each other by a predetermined distance at a first end of the bottom surface section 810 and third and fourth fixing sidewalls 860, 870 spaced from each other by a predetermined distance at a second end of the bottom surface section opposite the first end.

The first and second fixing sidewalls 840, 850 are coupled with the first guide frame 600. In the same manner, the third and fourth fixing sidewalls 860, 870 are coupled with the second guide frame 700.

The first and second fixing sidewalls 840 and 850 are formed with first and second fixing holes 842 and 852 for fixing the first guide frame 600. The first and second fixing holes 842 and 852 extend from center portions of the first and second fixing sidewalls 840 and 850 to a predetermined portion of the bottom surface section 810 of the bottom chassis 800. A portion of the bottom chassis 800 bordering the first fixing hole 842 is referred to as a first fixing ledge 842a and a portion of the first fixing sidewall 840 opposite the first fixing ledge 842a about the first fixing hole 842 is referred to as a second fixing ledge 842b. Similarly, a portion of the bottom chassis 800 bordering the second fixing hole 852 is referred to as a third fixing ledge 852a and a portion of the second fixing sidewall 850 opposite the third ledge 852a about the second fixing hole 852 is referred to as a fourth fixing ledge 852b.

In a similar way, the third and fourth fixing sidewalls 860 and 870 are formed with third and fourth fixing holes 862 and 872 for fixing the second guide frame 700. The third and fourth fixing holes 862 and 872 extend from center portions of the third and fourth fixing sidewalls 860 and 870 to a predetermined portion of the bottom surface section 810 of the bottom chassis 800. A portion of the bottom chassis 800 bordering the third fixing hole 862 is referred to as a fifth fixing ledge 862a and a portion of the third fixing sidewall 860 opposite the fifth fixing ledge 862a about the third fixing hole 862 is referred to as a sixth fixing ledge 862b. A portion of the bottom chassis 800 bordering the fourth fixing hole 872 is referred to as a seventh fixing ledge 872a and a portion of the fourth fixing sidewall 870 opposite the seventh ledge 872a about the fourth fixing hole 872 is referred to as an eighth fixing ledge 872b.

An interval between the third and fourth fixing sidewalls 860 and 870 may be larger than an interval between the first and second fixing sidewalls 840 and 850. In addition, a portion of the bottom surface section between the third and fourth fixing sidewalls 860 and 870 is outwardly protruded to form a grounding section 880. The grounding section 880 is connected to the gate tape carrier package 320, which is bent outwardly of the second guide frame 700 by the top chassis 230.

FIGS. 5 to 8 are detailed views showing the structure of the guide frame shown in FIG. 3. Hereinafter, the structure of the first guide frame 600 will be explained. The structure of the second guide frame 700 will be explained for parts other than those of the first guide frame 600.

As shown in FIGS. 5 to 8, the first guide frame 600 includes a first upper plate 610, a first inner wall 620 and a first outer wall 630. The first inner wall 620 and the first outer wall 630 perpendicularly extend from opposite side ends of the first upper plate 610 in the same direction.

The first inner wall 620 includes first and second fixing protrusions 612, 614 and recesses formed at opposite sides of each of the first and second fixing protrusions 612, 614. The first fixing protrusion 612 extends corresponding to the first fixing hole 842 of the bottom chassis 800. The second fixing protrusion 614 having a shape identical to the shape of the first fixing protrusion 612 is formed in a position corresponding to the second fixing hole 852 while spacing apart from the first fixing protrusion 612. The first and second fixing protrusions 612 and 614 are coupled with the first and third fixing ledges 842a and 852a, respectively, when the first guide frame 600 is received in the bottom chassis 800.

Figure 6:
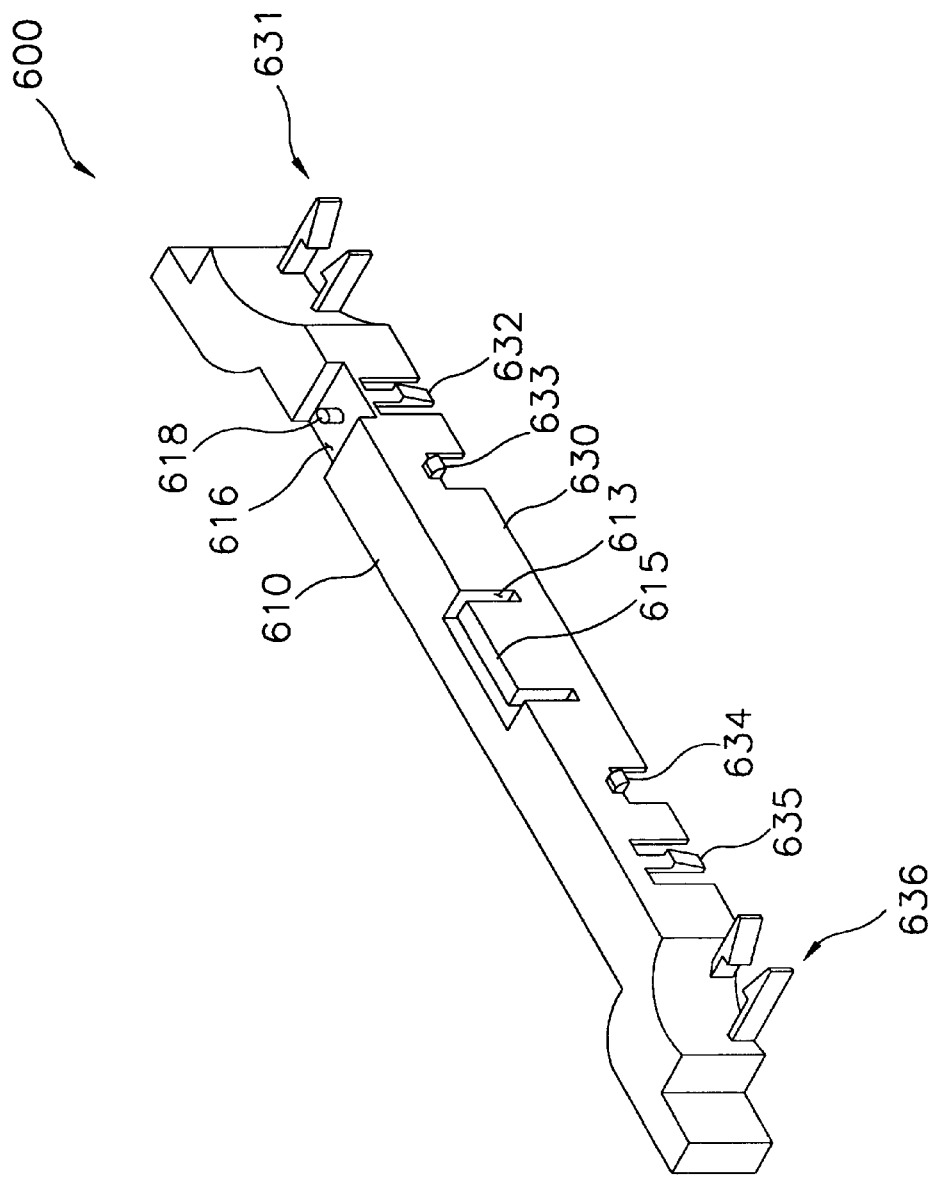
Figure 7:
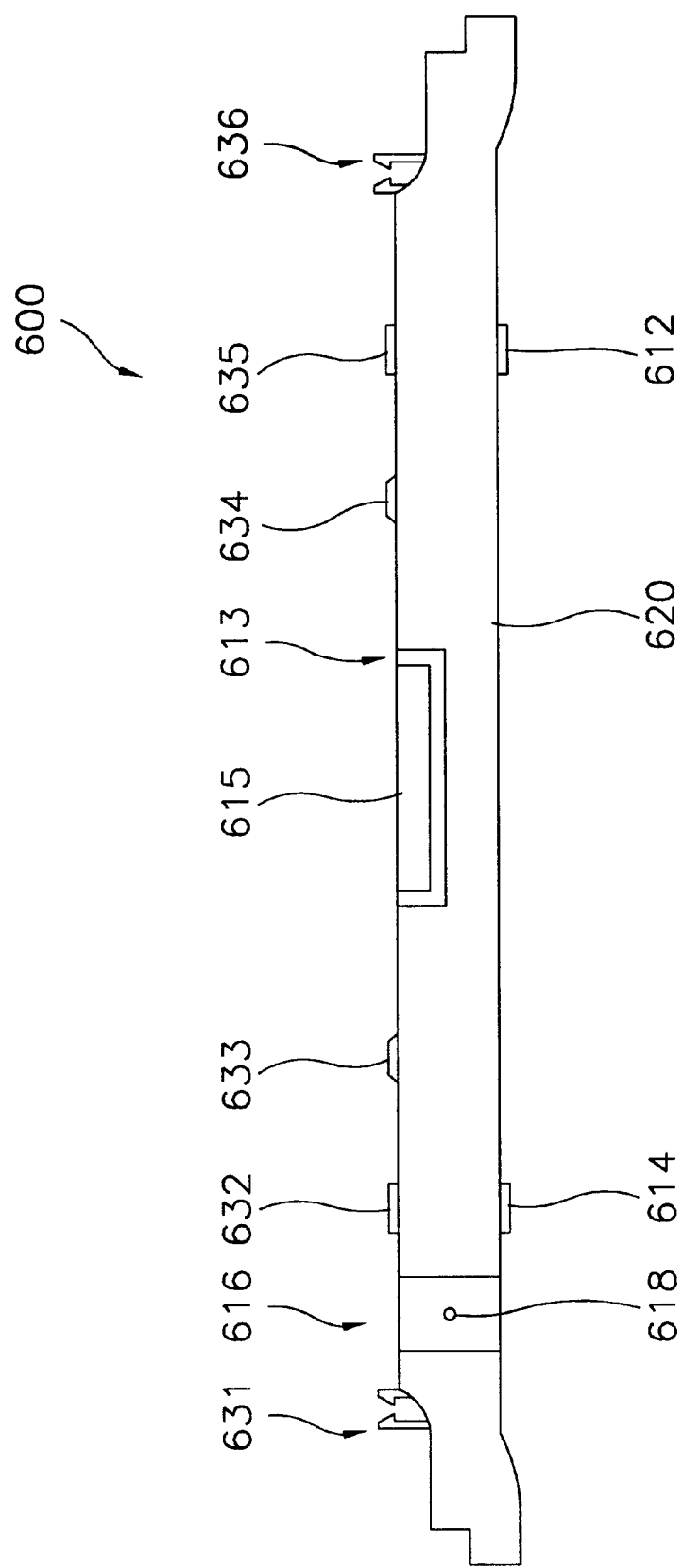

Referring to FIG. 6, the first outer wall 630 of the first guide frame 600 includes third and fourth fixing protrusions 632, 635 and recesses formed at opposite sides of each of the first and second fixing protrusions 612, 614. The third fixing protrusion 632 corresponds to the second fixing hole 852 of the bottom chassis 800. The fourth fixing protrusion 635 having a shape identical to the shape of the third fixing protrusion 632 is formed in a position corresponding to the first fixing hole 842 and is spaced from the third fixing protrusion 632. The third and fourth fixing protrusions 632 and 635 are coupled with the fourth and second fixing ledges 852b and 842b, respectively, when the first guide frame 600 is received in the bottom chassis 800.

Figure 8:
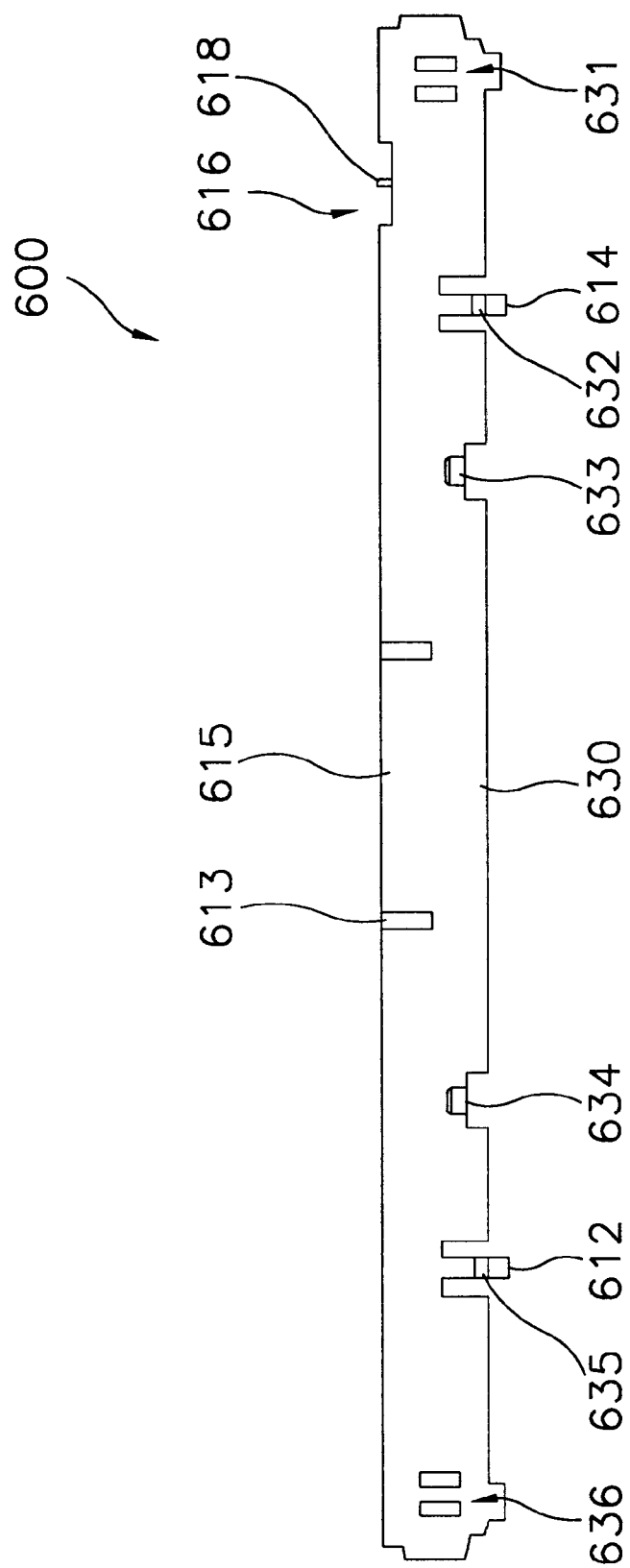

The third and fourth fixing protrusions 632 and 635 have a length identical with a width of the first outer wall 630. That is, as shown in FIG. 8, the third and fourth fixing protrusions 632 and 635 formed in the first outer wall 630 are shorter than the first and second fixing protrusions 612 and 614 formed in the first inner wall 610. The reason is that the first and third fixing ledges 842a and 852a coupled with the first and second fixing protrusions 612 and 614 are positioned at the bottom surface section 810 of the bottom chassis 800, however, the fourth and second fixing ledges 852b and 842b coupled with the third and fourth fixing protrusions 632 and 634 are positioned at the first and second fixing sidewalls 840 and 850 which are higher than the bottom surface section 810.

The seventh and eighth protrusions 633 and 634 are formed at the first outer wall 630 and provide a coupling force between the middle mold frame 400 and the bottom chassis 800 by being inserted into the coupling holes of the middle mold frame 400.

A portion of the first upper plate 610 of the first guide frame 600 is depressed with a predetermined depth to form a first recess section 616. A fifth fixing protrusion 618 is formed in the first recess section 616. The fifth fixing protrusion 618 is coupled with the coupling holes formed in the first projection 510a of the optical sheets 510 and prevents the optical sheets 510 from moving.

A second recess section 613 is formed in a center of the first guide frame 600. When viewed from an upper portion of the first upper plate 610, the second recess section 613 has substantially " ⊂ " shape. However, the shape of the second recess section 613 is not limited to " ⊂ " shape. The functions of the second recess section 613 will be described later with regard to the middle mold frame 400.

A first guide arm 631 is protruded outward from the first outer wall 630 at one end of the first outer wall 630 of the first guide frame 600. The first guide arm 631 includes a pair of arms, which are protruded from the first outer wall 630 and spaced from each other by a predetermined distance to form a receiving space therebetween. The first guide arm 631 receives and fixes a first power supply line (not shown), which is electrically connected to the lamp of the first lamp unit 530 for supplying the external power to the first lamp unit 530, and guides the first power supply line to a rear surface of the bottom chassis 800.

In the same way, a second guide arm 636 having a shape identical to the shape of the first guide arm 631 is formed at the other end of the first outer wall 630 of the first guide frame 600. The second guide arm 636 receives and fixes a second power supply line (not shown), which is electrically connected to the lamp of the second lamp unit 540 for supplying the external power to the second lamp unit 540, and guides the second power supply line to the rear surface of the bottom chassis 800.

The second guide frame 700 is coupled with the third and fourth fixing holes 862 and 872 of the bottom chassis 800. The second guide frame 700 has a shape identical to the shape of the first guide frame 600 coupled with the first and second fixing holes 842 and 852.

That is, the second guide frame 700 includes a second upper plate, a second inner wall and a second outer wall similar to the first guide frame 600. Sixth and seventh fixing protrusions 712, 714 coupled with the fifth and seventh fixing ledges 862a and 872a of the bottom chassis 800 are formed in the second inner wall, eighth and ninth fixing protrusions 732, 735 coupled with the sixth and eighth fixing ledges 862b and 872b of the bottom chassis 800 are formed in the second outer wall. A tenth fixing protrusion 718 coupled with coupling holes of the second projection 510b of the optical sheets 510 is formed in a third recess section 716 which is formed at a portion of the second upper plate 710. In addition, ninth and tenth protrusions 731 and 733 are formed in the second outer wall and provide a coupling force between the middle mold frame 400 and the bottom chassis 800. In addition, a fourth recess section 713 is formed in a center of the second guide frame 700. When viewed from an upper portion of the second upper plate 710, the fourth recess section 713 has substantially " ⊂ " shape, but is not limited thereto. The functions of the fourth recess section 713 will be described later together with the functions of the second recess section 613 formed in the first upper plate 610.

The second outer wall of the second guide frame 700 does not include a guide arm. The reason is that the first and second power supply lines (not shown) for supplying the external power to the first and second lamp units 630 and 640 are guided to the rear surface of the bottom chassis 800 by the first and second guide arms 631 and 636 which are formed in the first outer wall 630 of the first guide frame 600.

Hereinafter, the assembled structure of the liquid crystal display apparatus will be described in detail with reference to FIG. 9.

Figure 9:
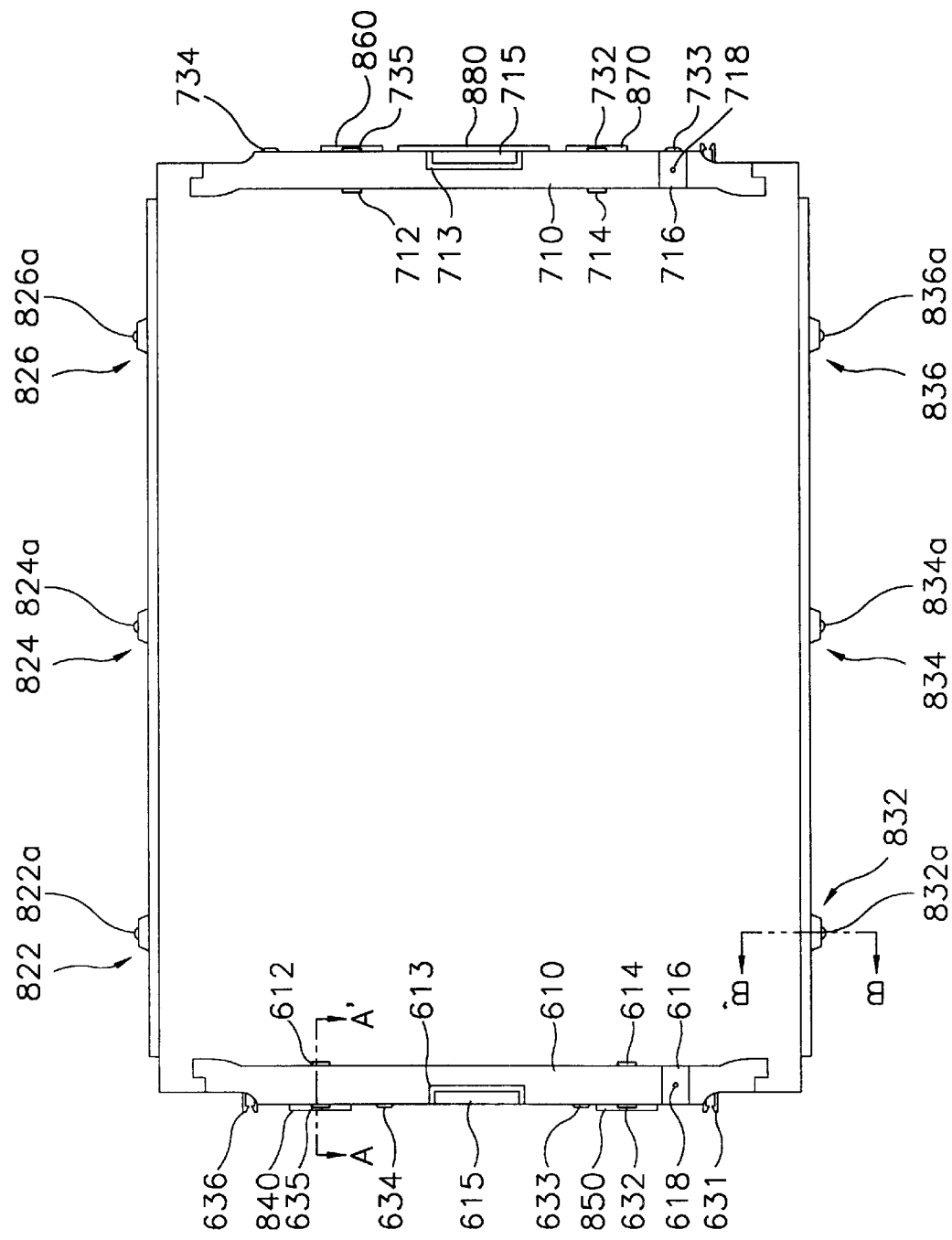
FIG. 9 is a plan view showing an assembled structure of a bottom chassis and a guide frame shown in FIG. 4.
Figure 10:
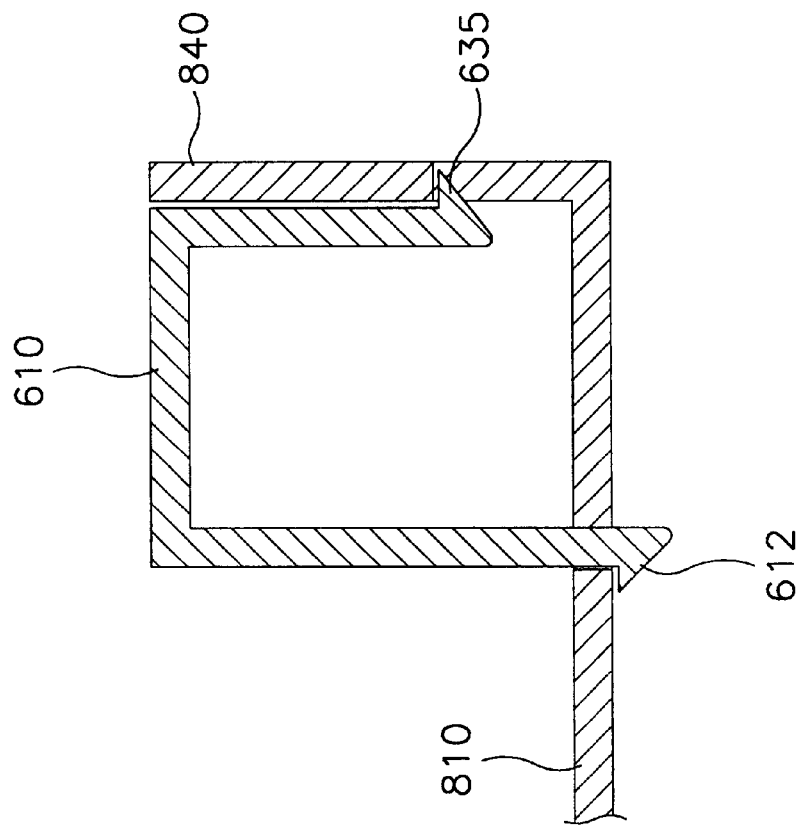
FIG. 10 is a sectional view taken along the line A–A' in FIG. 9 for showing an assembled structure of the bottom chassis and the guide frame.
Figure 11:
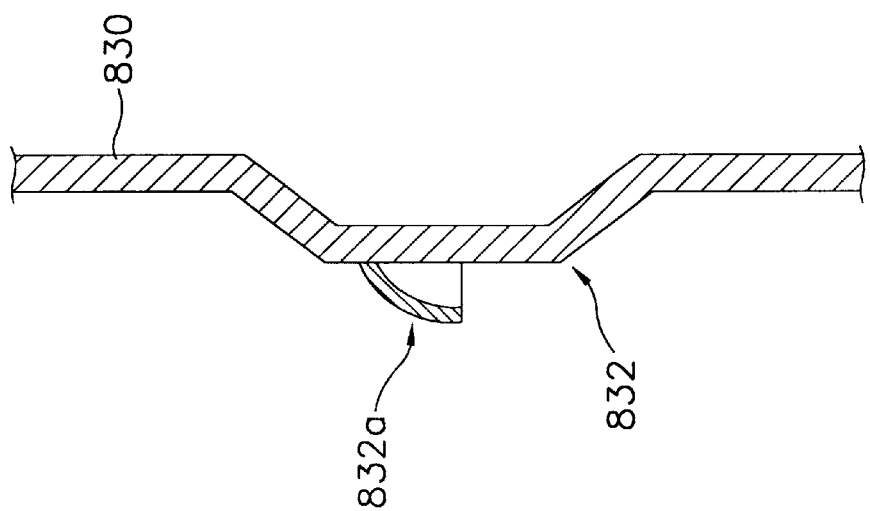
FIG. 11 is a sectional view taken along the line B–B' in FIG. 9 for showing the structure of protrusions of the bottom chassis shown in FIG. 4.

FIG. 9 is a plan view showing an assembled structure of the bottom chassis and the guide frame shown in FIG. 4, FIG. 10 is a sectional view taken along the line A–A' in FIG. 9 for showing the assembled structure of the bottom chassis and the guide frame, and FIG. 11 is a sectional view taken along the line B–B' in FIG. 9 for showing the structure of protrusions of the bottom chassis shown in FIG. 4.

Referring to FIGS. 5–9, the first guide frame 600 is combined with the first and second fixing sidewalls 840 and 850 of the bottom chassis 800. The first and fourth fixing protrusions 612 and 635 of the first guide frame 600 are inserted into the first fixing hole 842 of the bottom chassis 800 and the second and third fixing protrusions 614 and 632 of the first guide frame 600 are inserted into the second fixing hole 852 of the bottom chassis 800. In addition, the first and second fixing protrusions 612 and 614 of the first inner wall 620, which are longer than the third and fourth fixing protrusions 632 and 635 of the first outer wall 630, are engaged with the first and third fixing ledges 842a and 852a, respectively. The third and fourth fixing protrusions 632 and 635 are engaged with the fourth and second fixing ledges 852b and 842b, respectively.

The assembled structure of the first and fourth fixing protrusions 612 and 635 inserted into the first fixing hole 842 is shown in FIG. 10. Referring to FIG. 10, the protruding section of the first fixing protrusion 612 is engaged with the first fixing ledge 842a formed in the bottom surface section 810 of the bottom chassis 800, and the protruding section of the fourth fixing protrusion 635 is engaged with the second fixing ledge 842b of the first fixing sidewall 840. The assembled structure of the second and third fixing protrusions 614 and 632 inserted into the second fixing hole 852 is identical with the assembled structure of the first and fourth fixing protrusions 612 and 635.

The structure of the third fixing hole 862 of the bottom chassis 800 assembled with the fifth and eighth fixing protrusions 712 and 735 of the second guide frame 700 inserted into the third fixing hole 862, and the structure of the fourth fixing hole 872 of the bottom chassis 800 assembled with the sixth and seventh fixing protrusions 714 and 732 of the second guide frame 700 are the same as illustrated in FIG. 10.

As shown in FIG. 4, the first, second and third protrusions 822a, 824a and 826a are respectively provided at the first, second and third embossing parts 822, 824 and 826 which are protruded from the first sidewall 820 by a predetermined height. Similarly, fourth, fifth and sixth protrusions 832a, 834a and 836a are respectively provided at the fourth, fifth and sixth embossing parts 832, 834 and 836 which are protruded from the second sidewall 830 by a predetermined height. FIG. 11 shows the structure of the embossing part with the protrusion in detail.

The first to sixth embossing parts 822, 824, 826, 832, 834 and 836 provide a coupling force between the bottom chassis 800 and the middle mold frame 400, and the first to sixth protrusions 822a, 824a, 826a, 832a, 834a and 836a provide a coupling force between the bottom chassis 800 and the top chassis 230. The assembled structure of the bottom chassis 800 with the middle mold frame 400 and the assembled structure of the bottom chassis 800 with the top chassis 230 will be explained in detail with reference to following figures.

Figure 12:
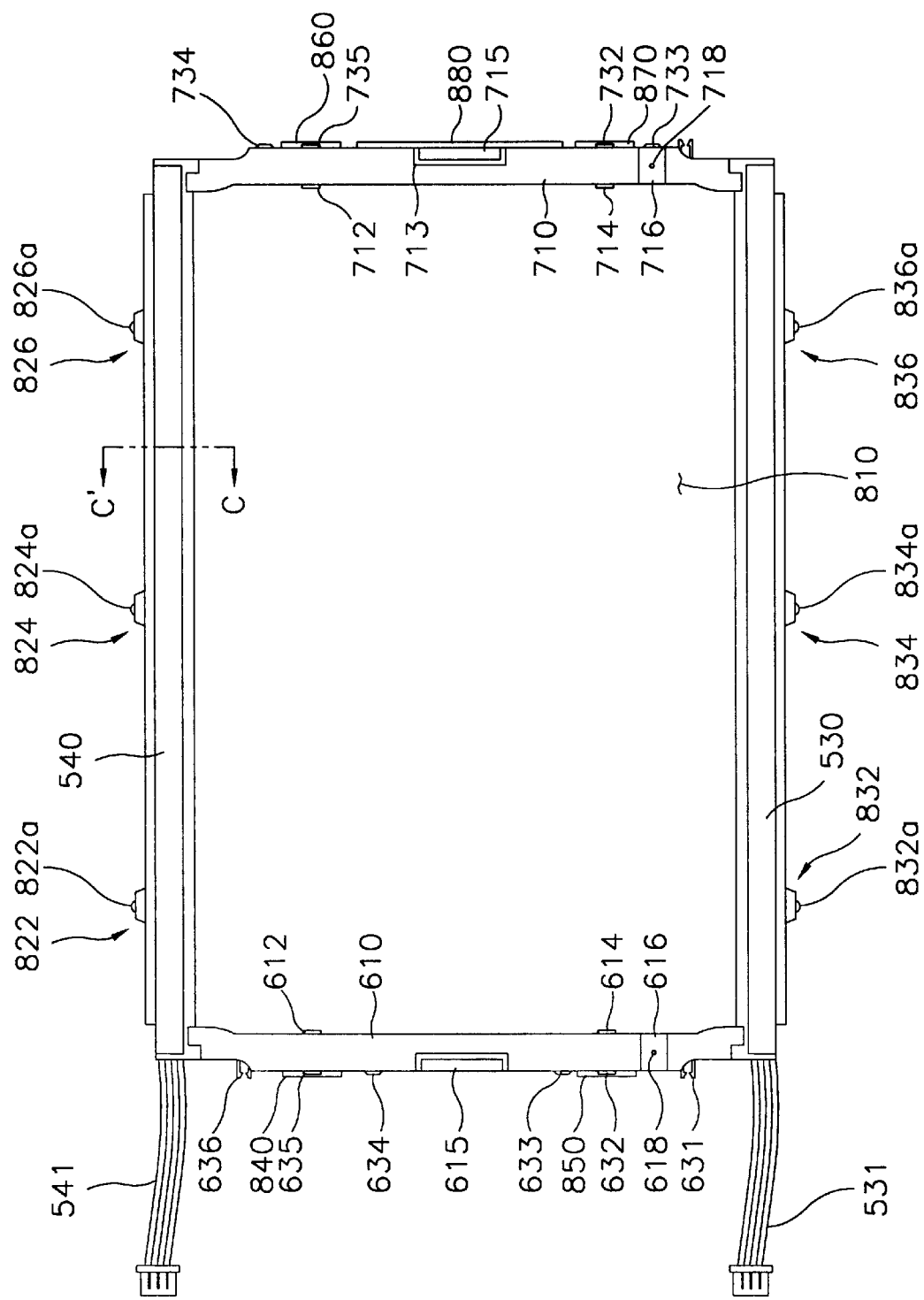
FIG. 12 is a plan view showing an assembled structure of first and second lamp units and the bottom chassis shown in FIG. 9.
Figure 13:
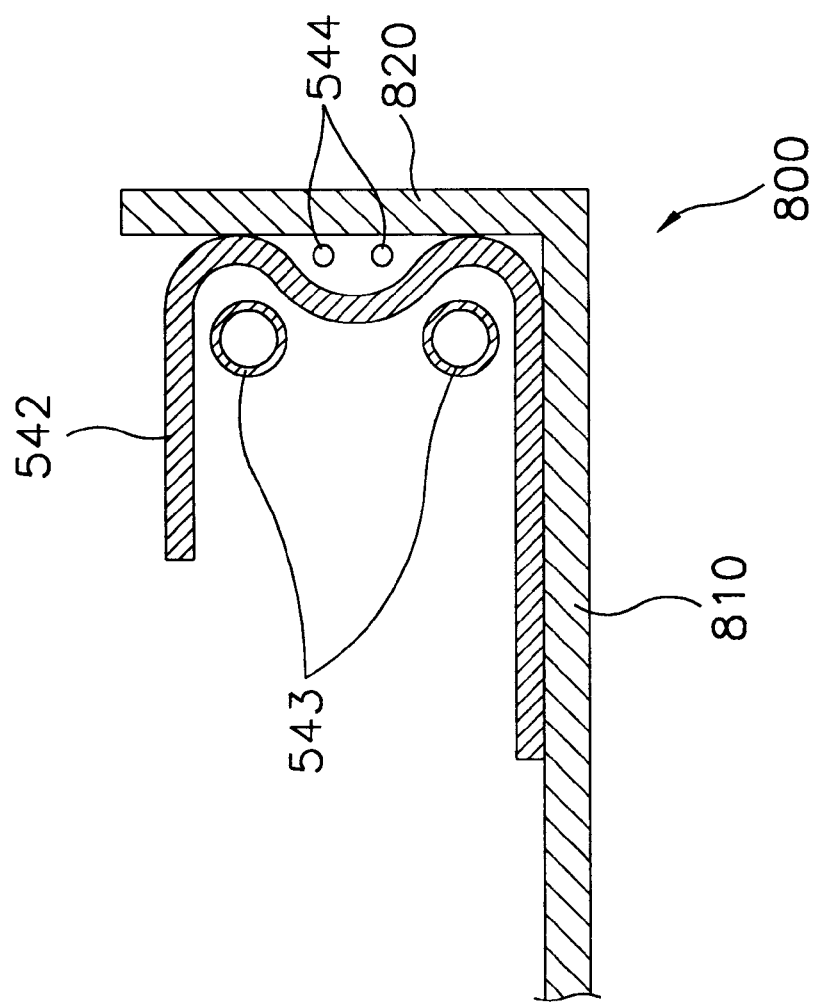
FIG. 13 is a sectional view taken along the line C–C' in FIG. 12 for showing an assembled structure of the bottom chassis and the lamp units shown in FIG. 12.
Figure 14:
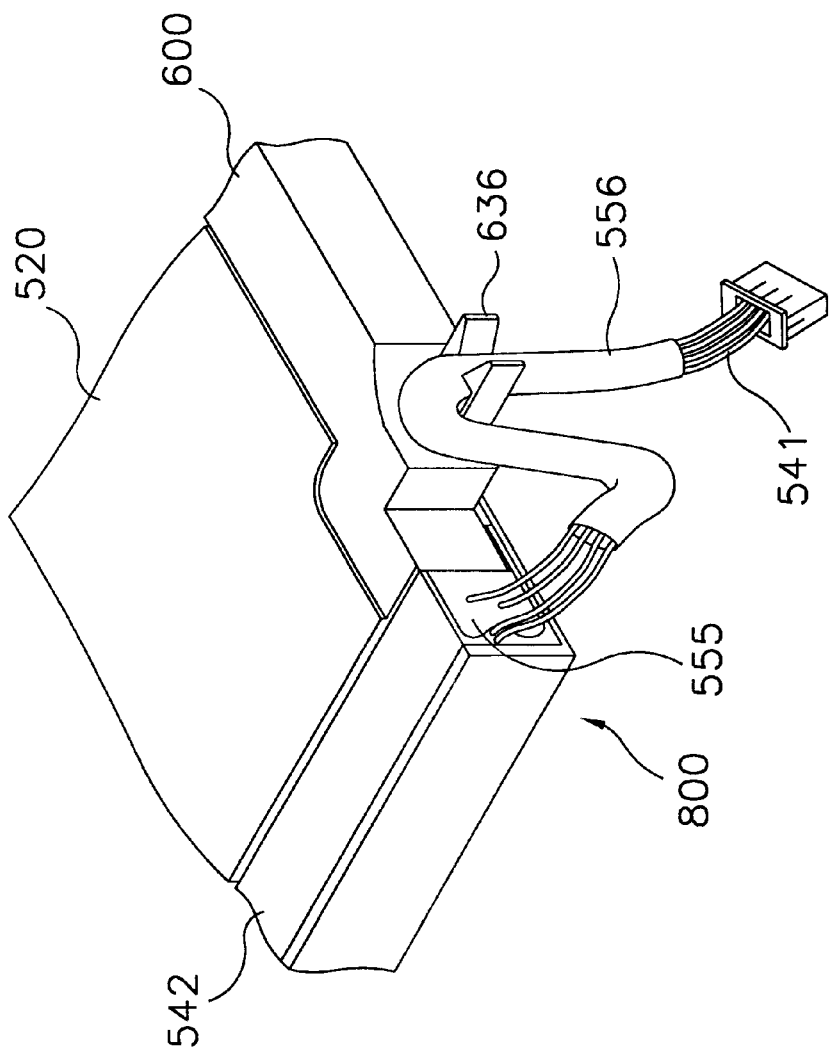
FIG. 14 is a perspective view showing a guide structure of a second power supplying line shown in FIG. 12.

FIG. 12 is a plan view showing the assembled structure of first and second lamp units coupled to the bottom chassis shown in FIG. 9, FIG. 13 is a sectional view taken along the line C–C' in FIG. 12 for showing the assembled structure of the bottom chassis with the lamp units shown in FIG. 12, and FIG. 14 is a perspective view showing a guide structure of the second power supply line shown in FIG. 12. Since the first and second lamp units 530 and 540 have the same shapes and elements with each other, only the structure of the second lamp unit 540 will be explained below.

Referring to FIGS. 13 and 14, the second lamp unit 540 includes a plurality of lamps 543, a lamp cover 542 for protecting the lamp 543 while reflecting the light emitted from the lamp 543 to the light guiding plate 520, a lamp holder 555 disposed at both ends of the lamp 543 for preventing the lamp 543 received in the lamp cover 542 from moving, and a second power supply line 541 for supplying the driving power to the lamp 543.

After assembling the first and second guide frames 600 and 700 with the bottom chassis 800, as shown in FIG. 12, the second lamp unit 540 is installed adjacent to the first sidewall 820 of the bottom chassis 800 and the first lamp unit 530 is installed adjacent to the second sidewall 830 of the bottom chassis 800.

As shown in FIG. 13, the second lamp unit 540 is installed in such a manner that the lamp cover 542 directly contacts the first sidewall 820 of the bottom chassis 800. Similarly, a lamp cover (not shown) of the first lamp unit 530 directly contacts the second sidewall 830 of the bottom chassis 800.

In this manner, by installing the lamp cover 542 of the second lamp unit 540 to directly contact the first sidewall 820 of the bottom chassis 800, the heat generated from the lamps 543 of the second lamp unit 540 can be easily discharged through the lamp cover 542 and the first sidewall 820. In addition, the size of the liquid crystal display apparatus can be reduced by a thickness of a mold frame (not shown), which is provided between a lamp cover and a sidewall of a bottom chassis in conventional liquid crystal display apparatus in order to secure the receiving position of a lamp unit.

As shown in FIG. 12, a first power supply line 531 supplies the driving power to the first lamp unit 530 and the second power supply line 541 supplies the driving power to the second lamp unit 540. The second power supply line 541 is guided by the second guide arm 636 of the first guide frame 600 as shown in FIG. 14. Similarly, the first power supply line 531 is guided by the first guide arm 631 of the first guide frame 600.

The second power supply line 541 is connected to an inverter circuit (not shown), which is mounted on a rear surface of the bottom chassis 800 by means of the second guide arm 636. In detail, referring to FIGS. 12–14, a high voltage power supply line for supplying the high voltage to the lamps 543 of the second lamp unit 540 is connected to the lamps 543 through the first lamp holder 555 disposed at one end of the lamps 543, and a lower voltage power supply line 544 for supplying the low voltage to the lamps 543 of the second lamp unit 540 is connected to the lamps 543 through the second lamp holder (not shown) disposed at the other end of the lamps 543.

As shown in FIGS. 13 and 14, the low voltage power supply line 544 extends towards the first lamp holder 555 along the rear surface of the lamp cover 542 and is wrapped with a shrinkable tube 556 together with the high voltage power supplying line. The second power supply line 541 wrapped with the shrinkable tube 556 is received in a receiving space provided by the second guide arm 636, and a connector connected to the end of the second power supply line 541 is guided to the rear surface of the bottom chassis 800 and electrically connected to a connector of the inverter circuit (not shown). In the same manner as explained for the second power supply line 541, the first power supply line 531 of the first lamp unit 530 is guided to the inverter circuit through the first guide arm 631.

Figure 15:
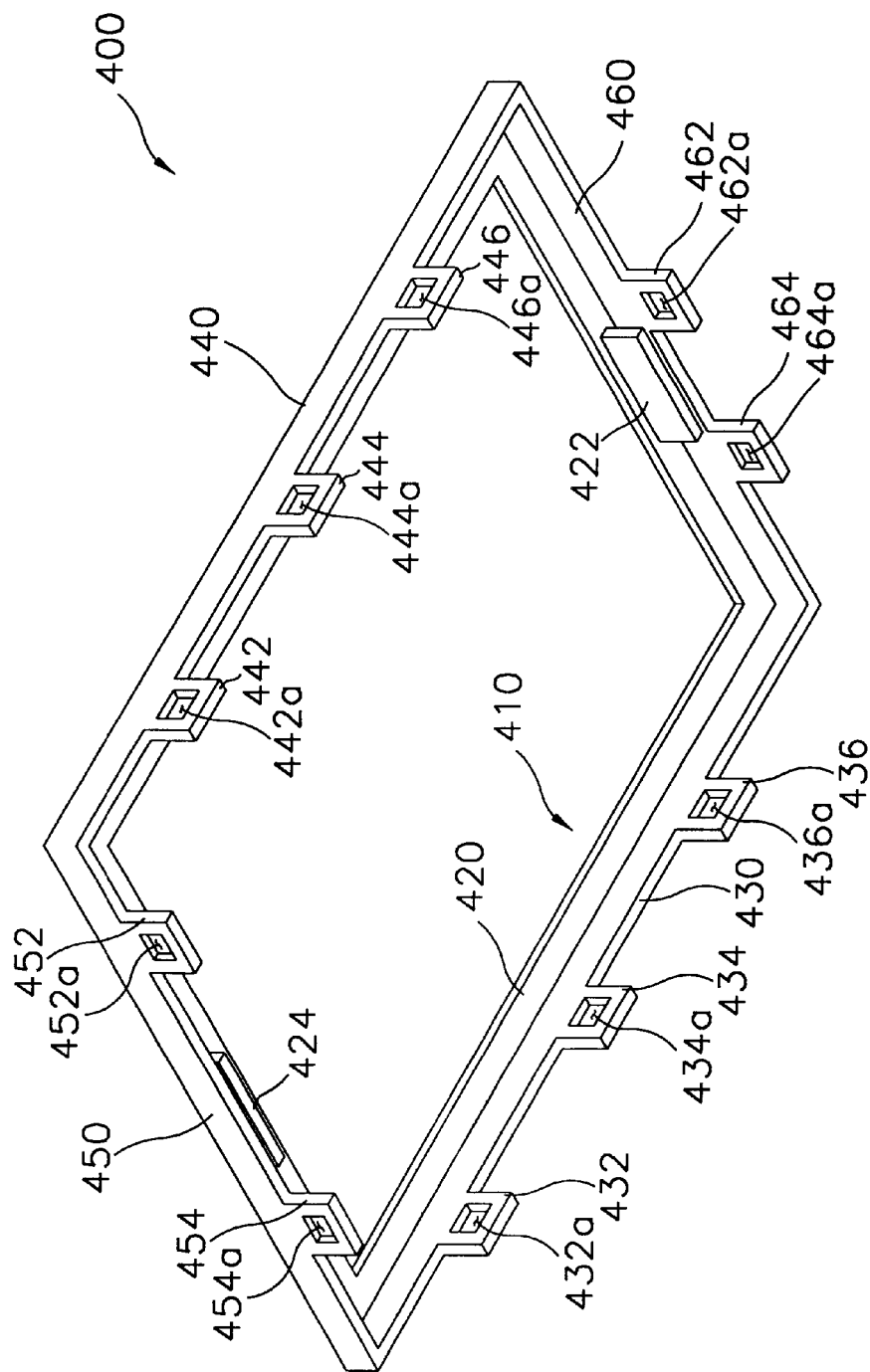
FIG. 15 is a perspective view showing a structure of a middle mold frame shown in FIG. 3.

FIG. 15 is a perspective view showing the structure of the middle mold frame shown in FIG. 3.

The middle mold frame 400 is combined with the bottom chassis 800 and first and second guide frames 600 and 700 and fixes the light guiding plate 520, optical sheets 510, the first lamp unit 530 and the second lamp unit 540 to the bottom chassis 800.

A bottom surface 410 of the middle mold frame 400 is entirely opened except for a predetermined periphery portion 420. Therefore, the light incident through the light guiding plate 520 and the optical sheets 510 can be supplied to the display unit 300. First to fourth sidewalls 430, 440, 450, and 460 of the middle mold frame 400, which extend from each end of the bottom surface 410 towards the bottom chassis 800 perpendicular to the periphery portion 420 include first to tenth frame protrusion 432, 434, 436, 442, 444, 446, 452, 454, 462 and 464, which are formed with first to tenth coupling holes. The first to sixth coupling holes 432a, 434a, 436a, 442a, 444a and 446a are coupled to the first to sixth embossing parts 822, 824, 826, 832, 834 and 836 of the bottom chassis 800, seventh and eighth coupling holes 452a and 454a are coupled with the seventh and eighth protrusions 633 and 634 of the first guide frame 600, and ninth and tenth coupling holes 462a and 464a are coupled with the ninth and tenth protrusions 731 and 733 of the second guide frame 700.

In detail, the first, second and third embossing parts 822, 824 and 826 formed at an outer portion of the first sidewall 820 of the bottom chassis 800 are coupled with the first, second and third coupling holes 432a, 434a and 436a of the middle mold frame 400, and the fourth, fifth and sixth embossing parts 832, 834 and 836 formed at the second sidewall 830 of the bottom chassis 800 are coupled with the fourth, fifth and sixth coupling holes 442a, 444a and 446a of the middle mold frame 400.

The first to sixth protrusions 822a, 824a, 826a, 832a, 834a and 836a formed in the first to sixth embossing parts 822, 824, 826, 832, 834 and 836 are exposed to the exterior of the first to sixth coupling holes 432a, 434a, 436a, 442a, 444a and 446a.

The seventh and eighth coupling holes 452a and 454a are respectively coupled with the seventh and eighth protrusions 633 and 634 of the first guide frame 600 and partially protruded to the exterior of the seventh and eighth coupling holes 452a and 454a. In the same manner, the ninth and tenth coupling holes 462a and 464a are respectively coupled with the ninth and tenth protrusions 731 and 733 of the second guide frame 700 and partially protruded to the exterior of the ninth and tenth coupling holes 462a and 464a. The bottom surface 410 includes first and second fixing projection 424, 422 in positions corresponding to the second and fourth recess sections 613, 713 formed in the first and second guide frame 600, 700. That is, when the middle mold frame 400 is coupled to the first and second guide frame 600, 700, the first and second fixing projections 424, 422 are inserted to the second and fourth recess sections 613, 713.

Figure 16:
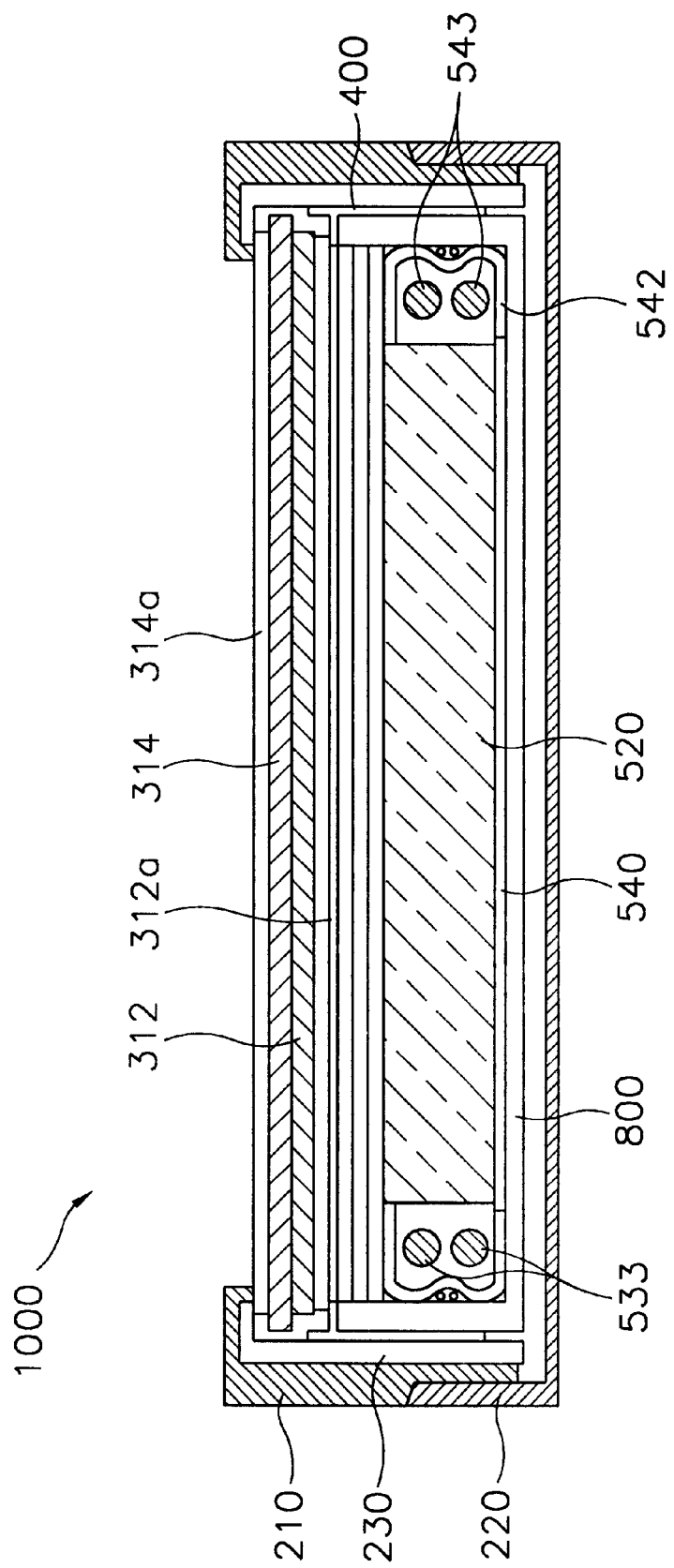
FIG. 16 is a sectional view showing an assembled structure of the liquid crystal display apparatus shown in FIG. 3.

After assembling the middle mold frame 400 with the bottom chassis 800, the display unit 300, the top chassis 230, a front case 210 and a rear case 220 are assembled with each other, as shown in FIG. 16.

Turning now to FIG. 12, after disposing the reflecting plate 550 in a receiving space of the bottom chassis 800, the first guide frame 600 is fixed to the first and second fixing sidewalls 840 and 850 of the bottom chassis 800, and the second guide frame 700 is fixed to the third and fourth fixing sidewalls 860 and 870 of the bottom chassis 800.

Then, as shown in FIGS. 12, 13 and 16, the lamp cover of the first lamp unit 530 is disposed at the second sidewall 830 of the bottom chassis 800 such that the lamp cover directly contacts the second sidewall 830 of the bottom chassis 800. In addition, the lamp cover 542 of the second lamp unit 540 is disposed at the first sidewall 820 of the bottom chassis 800 such that the lamp cover 542 directly contacts the first sidewall 820 of the bottom chassis 800. Then, the light guiding plate 520 and the optical sheets 510 are sequentially received in the receiving space of the bottom chassis 800. An A/D board (not shown) and an inverter board (not shown) are coupled to the rear surface of the bottom chassis 800.

Thereafter, the middle mold frame 400 is coupled to the bottom chassis 800 thereby fixing the reflecting plate 550, the first and second guide frames 600 and 700, the light guiding plate 520, and the optical sheets 510 to the bottom chassis 800. The first to tenth protrusions 822a, 824a, 826a, 832a, 834a, 836a, 633, 634, 731 and 733 are still exposed to the exterior of the first to tenth coupling holes 432a, 434a, 436a, 442a, 444a, 446a, 452a, 454a, 462a and 464a of the middle mold frame 400.

After settling the display unit 300 on the upper portion of the middle mold frame 400, the top chassis 230 is combined with the middle mold frame 400 from the upper surface of the display unit 300. Coupling holes (not shown) coupled with the first to tenth protrusions 822a, 824a, 826a, 832a, 834a, 836a, 633, 634, 731 and 733 are formed in the sidewall of the top chassis 230.

Then, the front case 210 is assembled from the top chassis side, and the rear case 220 is assembled from the bottom chassis side in opposition to the front case 210, thereby completing the assembling work of the liquid crystal display apparatus. The assembled structure of the liquid crystal display apparatus is shown in FIG. 16 illustrating a sectional view thereof.

According to the liquid crystal display apparatus of the present invention, the lamp cover for protecting the lamp is mounted while directly contacting the bottom chassis. In addition, the light guiding plate and the optical sheets are prevented from moving by guide frames, which are respectively disposed at opposite sidewalls of the bottom chassis perpendicular to the lamp.

Therefore, it is possible to provide the receiving space for the light guiding plate, the optical sheets and the lamp units while reducing the size of the liquid crystal display apparatus by the thickness of the mold frame provided to prevent these elements from moving in the conventional liquid crystal display apparatus.

In addition, the mold frame having a low thermal conductivity is not present between the lamp cover and the sidewall of the bottom chassis, so the heat generated from the lamp can be easily discharged.

While the present invention has been described in detail with reference to the preferred embodiments thereof, it should be understood to those skilled in the art that various changes, substitutions and alterations can be made hereto without departing from the scope of the invention as defined by the appended claims.

What is claimed is:

1. A liquid crystal display module comprising:
   a light generating means for generating a light;
   a light guiding means for guiding the light to a displaying means for displaying an image;
   a receiving means for receiving the light generating means and the light guiding means; and
   a guiding means for guiding the light generating means and the light guiding means to receiving positions in the receiving means, the guiding means being coupled to first opposite ends of the receiving means;
   wherein the light generating means is placed on at least one end of second opposite ends of the receiving means and directly contacts a sidewall of the second opposite ends of the receiving means, the second opposite ends being perpendicular to the first opposite ends.

2. The liquid crystal display module as claimed in claim 1, wherein the receiving means comprises a bottom surface section and a sidewall section, and sidewalls of the first opposite ends of the receiving means coupled with the guiding means are partially opened.

3. The liquid crystal display module as claimed in claim 2, wherein the sidewalls of the first opposite ends are formed with perforation holes extending to a portion of the bottom surface section of the receiving means.

4. The liquid crystal display module as claimed in claim 3, wherein the guiding means comprises a first mold frame coupled to a first end of the first opposite ends of the receiving means and a second mold frame coupled to a second end of the first opposite ends of the receiving means, the second end being opposite the first end.

5. The liquid crystal display module as claimed in claim 4, wherein the first mold frame comprises a first protrusion coupled with the perforation holes formed at a sidewall of the first end of the first opposite ends of the receiving means, and the second mold frame comprises a second protrusion coupled with the perforation holes formed at a sidewall of the second end of the first opposite ends of the receiving means.

6. The liquid crystal display module as claimed in claim 1, wherein the guiding means comprises a first mold frame coupled to a first end of the first opposite ends of the receiving means and a second mold frame coupled to a second end of the first opposite ends of the receiving means, the second end being opposite the first end.

7. The liquid crystal display module as claimed in claim 1, further comprising a brightness improving means disposed above the light guiding means for improving a brightness of the light generated from the light generating means.

8. The liquid crystal display module as claimed in claim 7, further comprising a fixing means disposed above the brightness improving means and coupled with the guiding means and the receiving means to fix the light guiding means and the brightness improving means to the receiving means.

9. The liquid crystal display module as claimed in claim 8, wherein the guiding means comprises first and second mold frames, each of the first and second mold frames including an upper surface which is partially depressed to form a recess.

10. The liquid crystal display module as claimed in claim 9, wherein the fixing means comprises a bottom surface including a fixing projection, the fixing projection being inserted into each of the recesses formed in the first and second mold frames, preventing the guiding means from separating from the receiving means.

11. The liquid crystal display module as claimed in claim 1, further comprising a fixing means disposed below the displaying means and coupled with the guiding means and the receiving means to fix the light guiding means to the receiving means.

12. The liquid crystal display module as claimed in claim 1, wherein the displaying means comprises a liquid crystal panel for displaying the image, and a printed circuit board for controlling an operation of the liquid crystal panel.

13. The liquid crystal display module as claimed in claim 12, wherein a bottom surface of a second end of the first opposite ends of the receiving means is partially protruded to ground the printed circuit board.

14. The liquid crystal display module as claimed in claim 12, wherein the printed circuit board is a gate printed circuit board for controlling an operation of a gate line of the liquid crystal panel.

15. A liquid crystal display device comprising:
 a light generating means for generating a light;
 a light guiding means for guiding the light;
 a brightness improving means for improving a brightness of the light emitted from the light guiding means;
 a receiving means for receiving the light generating means, the light guiding means and the brightness improving means;
 a guiding means coupled to first opposite ends of the receiving means, for guiding the light generating means, the light guiding means, and the brightness improving means to receiving positions in the receiving means;
 a fixing means disposed above the brightness improving means and coupled with the receiving means and the guiding means to fix the light guiding means and the brightness improving means to the receiving means;
 a displaying means disposed above the fixing means for displaying an image corresponding to the light supplied through the brightness improving means;
 a front case for receiving the displaying means at a front of the displaying means; and
 a rear case coupled with the front case at a rear of the receiving means,
 wherein the light generating means is placed on at least one of second opposite ends of the receiving means and directly contacts a sidewall of the second opposite ends of the receiving means, the second opposite ends being perpendicular to the first opposite ends.

16. The liquid crystal display device as claimed in claim 15, wherein the receiving means comprises a bottom surface section and a sidewall section, and sidewalls of the first opposite ends of the receiving means coupled with the guiding means are partially opened.

17. The liquid crystal display device as claimed in claim 16, wherein the sidewalls of the first opposite ends are formed with a perforation hole extending to a portion of the bottom surface section of the receiving means.

18. The liquid crystal display device as claimed in claim 17, wherein the guiding means comprises a first mold frame coupled to a first end of the first opposite ends of the receiving means and a second mold frame coupled to a second end of the first opposite ends of the receiving means, the second end being opposite the first end.

19. The liquid crystal display device as claimed in claim 18, wherein the first mold frame comprises a first protrusion coupled with the perforation holes formed at a sidewall of the first end of the first opposite ends of the receiving means, and the second mold frame comprises a second protrusion coupled with the perforation holes formed at a sidewall of the second end of the first opposite ends of the receiving means.

20. The liquid crystal display device as claimed in claim 15, wherein the guiding means comprises a first mold frame coupled to a first end of the first opposite ends of the receiving means and a second mold frame coupled to a second end of the first opposite ends of the receiving means, the second end being opposite the first end.

21. The liquid crystal display device as claimed in claim 20, wherein each of the first and second mold frames comprises an upper surface which is partially depressed to form a recess.

22. The liquid crystal display device as claimed in claim 21, wherein the fixing means comprises a bottom surface including a fixing projection, the fixing projection being inserted into each of the recesses formed in the first and second mold frames, preventing the guiding means from separating from the receiving means.

23. The liquid crystal display device as claimed in claim 15, wherein the displaying means comprises a liquid crystal panel for displaying the image, and a printed circuit board for controlling an operation of the liquid crystal panel.

24. The liquid crystal display device as claimed in claim 23, wherein a bottom surface of a second end of the first opposite ends of the receiving means is partially protruded to ground the printed circuit board.

25. The liquid crystal display device as claimed in claim 23, wherein the printed circuit board is a gate printed circuit board for controlling an operation of a gate line of the liquid crystal panel.

* * * * *